United States Patent
Tojo

(10) Patent No.: US 7,145,684 B2
(45) Date of Patent: Dec. 5, 2006

(54) IMAGE PROCESSING APPARATUS AND METHOD, IMAGE PROCESSING PROGRAM, AND COMPUTER READABLE STORAGE MEDIUM STORING IMAGE PROCESSING PROGRAM

(75) Inventor: Hiroshi Tojo, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1098 days.

(21) Appl. No.: 10/022,371

(22) Filed: Dec. 20, 2001

(65) Prior Publication Data

US 2002/0122212 A1     Sep. 5, 2002

(30) Foreign Application Priority Data

Dec. 27, 2000   (JP)   .............................. 2000/399038
Dec. 14, 2001   (JP)   .............................. 2001/382165

(51) Int. Cl.
   *H04N 1/40*   (2006.01)
(52) U.S. Cl. .................................... 358/1.16; 358/1.18
(58) Field of Classification Search ...... 358/1.15–1.18, 358/1.9, 2.1; 725/40–41; 348/564–567
See application file for complete search history.

(56) References Cited

U.S. PATENT DOCUMENTS

| | | | |
|---|---|---|---|
| 6,219,837 B1* | 4/2001 | Yeo et al. ...................... | 725/38 |
| 6,633,308 B1* | 10/2003 | Ono et al. ................... | 715/723 |
| 6,697,523 B1* | 2/2004 | Divakaran et al. .......... | 382/173 |
| 6,829,781 B1* | 12/2004 | Bhagavath et al. ............ | 725/94 |
| 6,956,904 B1* | 10/2005 | Cabasson et al. ....... | 375/240.26 |
| 6,959,221 B1* | 10/2005 | Kataoka ...................... | 700/94 |
| 6,963,378 B1* | 11/2005 | Li et al. ..................... | 348/700 |
| 2002/0047936 A1 | 4/2002 | Tojo | |

* cited by examiner

*Primary Examiner*—Thomas D. Lee
*Assistant Examiner*—Stephen Brinich
(74) *Attorney, Agent, or Firm*—Fitzpatrick, Cella, Harper & Scinto

(57) ABSTRACT

An image processing method of reproducing already stored moving image data while storing moving image data currently input. Input moving image data is stored in a moving image storage unit, and scene feature information of each of a plurality of scenes constituting the moving image data stored in the moving image data storage unit is extracted. In accordance with the extracted scene feature information, digest data for reproducing a digest of the moving image data is formed. In accordance with the formed digest data, a digest of the moving image data stored in the moving image data storage unit is reproduced.

2 Claims, 12 Drawing Sheets

| SCENE ID | LEADING FRAME ID | SCENE LENGTH | INTENCE OF SCENE |
|---|---|---|---|
| 1 | 1 | 90 | 90 |
| 2 | 91 | 180 | 53 |
| 3 | 181 | 360 | 85 |
| ⋮ | ⋮ | ⋮ | ⋮ |

| START FRAME ID | LENGTH |
|---|---|
| 501 | 60 |
| 811 | 60 |
| 1001 | 60 |
| ⋮ | ⋮ |

IMAGE PROCESSING APPARATUS AND METHOD, IMAGE PROCESSING PROGRAM, AND COMPUTER READABLE STORAGE MEDIUM STORING IMAGE PROCESSING PROGRAM

BACKGROUND OF THE INVENTION

1. Field of the Invention

The present invention relates to an image processing apparatus, an image processing method, an image processing program for making a computer execute image processing, and a computer readable storage medium storing codes of the image processing program, respectively to be used with an apparatus or system for receiving and storing information streams of television broadcast and executing a reproduction process or the like of the stored streams.

2. Related Background Art

Video tape recorders (VTR) are prevailing as an apparatus for receiving a television broadcast program, storing it in a storage medium (magnetic tape or the like), and reproducing information (video signals) of the television broadcast program stored in the storage medium in accordance with a user instruction (instructing to reproduce the program at a time designated by the user).

The capacities of storage media such as hard disks and optical disks capable of being randomly accessed are rapidly increasing nowadays. Apparatuses utilizing such large capacity storage media in place of magnetic tapes used by VTR or the like are being developed.

For example, various types of apparatuses are being developed by using VTR techniques and storage media which have large capacities and can be randomly accessed. One example of such apparatuses is an apparatus which stores or records a television broadcast program always in real time and allows a user to reproduce the program starting from any time in the past.

A conventional reproduction apparatus using a storage medium such as a hard disk and an optical disk capable of being randomly accessed cannot meet the user requirements of roughly grasping the program contents during the period from a desired time in the past to the current time, although the apparatus allows the user to reproduce the program in the storage medium starting from any time in the past.

More specifically, if information stored in the storage medium to be reproduced is a relay broadcast program of a sport game, a user views the game from the start thereof or the middle thereof by reproducing the game from the storage medium.

However, if the user wants to view the game from the start thereof, the current state of the game cannot be known, whereas if the user wants to view the game from the middle thereof, the previous state and progress of the game cannot be known.

With a conventional apparatus, it is not possible to roughly grasp the contents of a program stored during the period from any time in the past and to the current time.

SUMMARY OF THE INVENTION

The present invention has been made under the above-described circumstances to solve the above problem, and it is an object of the present invention to provide an image processing apparatus, an image processing method, an image processing program for making a computer execute image processing, and a computer readable storage medium storing codes of the image processing program.

According to a preferred embodiment of the present invention, there is provided an image processing apparatus for reproducing already stored moving image data while storing moving image data currently input, the image processing apparatus comprising: moving image data storing means for storing input moving image data; scene feature information extracting means for extracting scene feature information of each of a plurality of scenes constituting the moving image data stored in the moving image data storing means; digest forming means for forming digest data for reproducing a digest of the moving image data, in accordance with the scene feature information extracted by the scene feature information extracting means; and reproducing means for reproducing a digest of the moving image data stored in the moving image data storing means in accordance with the digest data formed by the digest data forming means.

According to another preferred embodiment of the present invention, there is provided an image processing method of reproducing already stored moving image data while storing moving image data currently input, the image processing method comprising: a storing step of storing input moving image data in moving image data storing means; a scene feature information extracting step of extracting scene feature information of each of a plurality of scenes constituting the moving image data stored in the moving image data storing means; a digest forming step of forming digest data for reproducing a digest of the moving image data, in accordance with the scene feature information extracted in the scene feature information extracting step; and a reproducing step of reproducing a digest of the moving image data stored in the moving image data storing means in accordance with the digest data formed in the digest data forming step.

According to another preferred embodiment of the present invention, there is provided an image processing program executable by a computer to reproduce already stored moving image data while storing moving image data currently input, the image processing program comprising: codes for a storing step of storing input moving image data in moving image data storing means; codes for a scene feature information extracting step of extracting scene feature information of each of a plurality of scenes constituting the moving image data stored in the moving image data storing means; codes for a digest forming step of forming digest data for reproducing a digest of the moving image data, in accordance with the scene feature information extracted in the scene feature information extracting step; and codes for a reproducing step of reproducing a digest of the moving image data stored in the moving image data storing means in accordance with the digest data formed in the digest data forming step.

According to another preferred embodiment of the present invention, there is provided a computer readable storage medium storing an image processing program for reproducing already stored moving image data while storing moving image data currently input, the image processing program comprising: codes for a storing step of storing input moving image data in moving image data storing means; codes for a scene feature information extracting step of extracting scene feature information of each of a plurality of scenes constituting the moving image data stored in the moving image data storing means; codes for a digest forming step of forming digest data for reproducing a digest of the moving image data, in accordance with the scene feature information extracted in the scene feature information extracting step; and codes for a reproducing step of reproducing a digest of the moving image data stored in the moving image data storing means in accordance with the digest data formed in the digest data forming step.

Other objects, features and advantages of the present invention will become apparent from the following detailed description taken in conjunction with the accompanying drawings.

DETAILED DESCRIPTION OF THE PREFERRED EMBODIMENTS

Embodiments of the present invention will be described with reference to the accompanying drawings.

Figure 1:
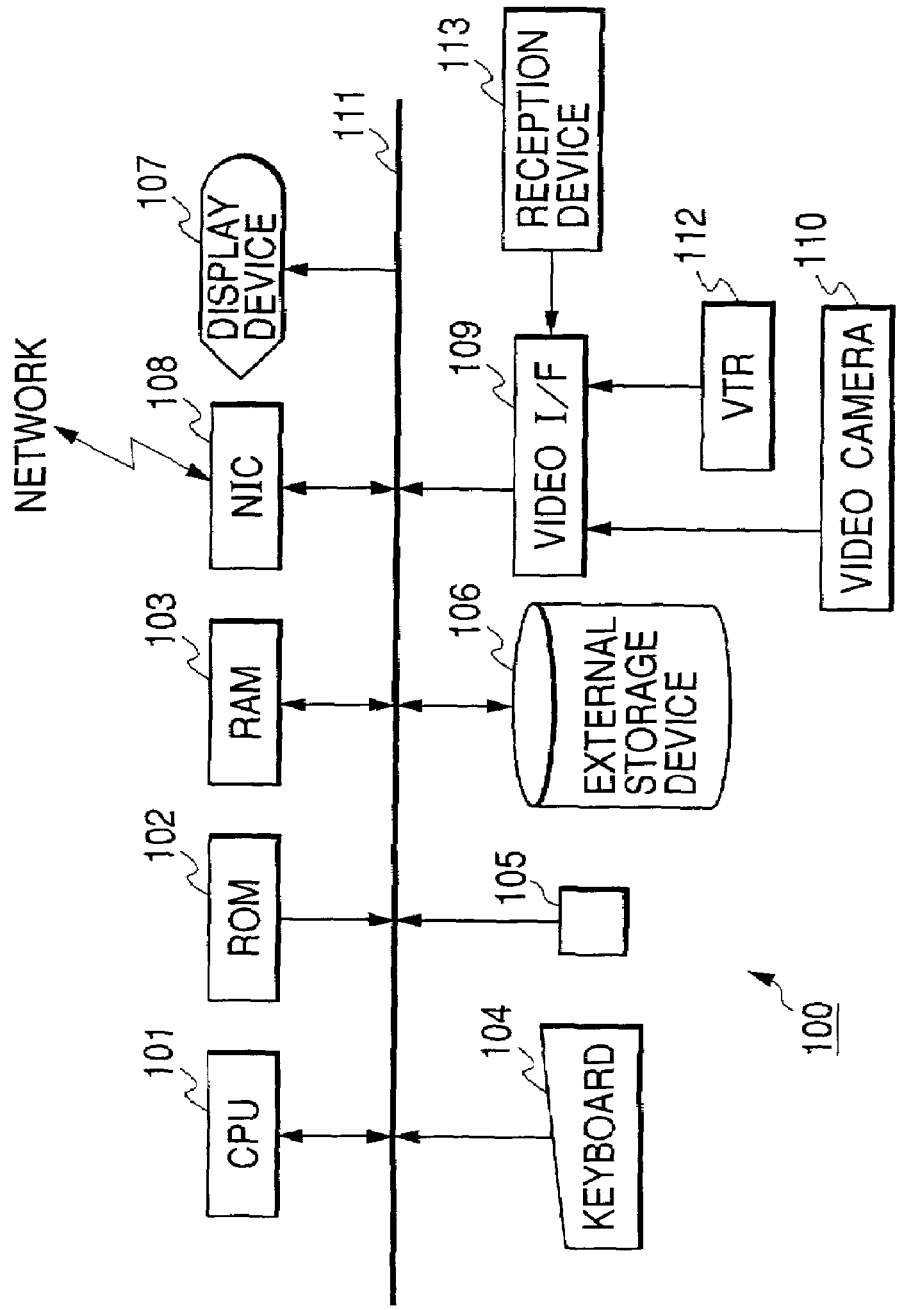
FIG. 1 is a block diagram showing the structure of an image processing apparatus according to a first embodiment.

A first embodiment of the present invention provides an image processing apparatus 100 such as shown in FIG. 1.

The image processing apparatus 100 of this embodiment has a reproduction function of reproducing a digest of past moving images by using a storage medium, and catching up a current broadcast. As shown in FIG. 1, the image processing apparatus 100 has a CPU 101, a ROM 102, a RAM 103, a keyboard 104, a mouse 105, an external storage device 106, a display device 107, a NIC 108, a video interface (I/F) 109, a video camera 110, a VTR 112 and a reception device 113, respectively connected to each other via a system bus 111 for communication among them.

CPU 101 executes a predetermined processing program to control the entirety of the image processing apparatus 100. ROM 102 stores processing programs (a boot program and the like executed when the image processing apparatus 100 starts up) for the operation control by CPU 101, and also stores various data. RAM 103 is loaded with the processing program from ROM 102 or the like under the control of CPU 101, and supplies a working memory area to be used when CPU 101 controls various operations.

The keyboard 104 and mouse 105 provide a user with environments (various input operation environments) for instructing various operations of the image processing apparatus 100 from a user. The external storage device 106 is constituted of a hard disk, a floppy disk, a CD-ROM or the like.

The display device 107 is constituted of a CRT display or the like and displays processing results or the like for a user. NIC 108 is a network interface card for communication with various apparatuses or systems on a network.

The video I/F 109 operates to capture moving images from the video camera 110 or VTR 112. The reception device 113 receives broadcast waves of a ground broadcasting, a satellite broadcasting or the like.

In the structure shown in FIG. 1, the video camera 110, VTR 112 and external storage device 106 may be located on the network connected via NIC 108.

Figure 2:
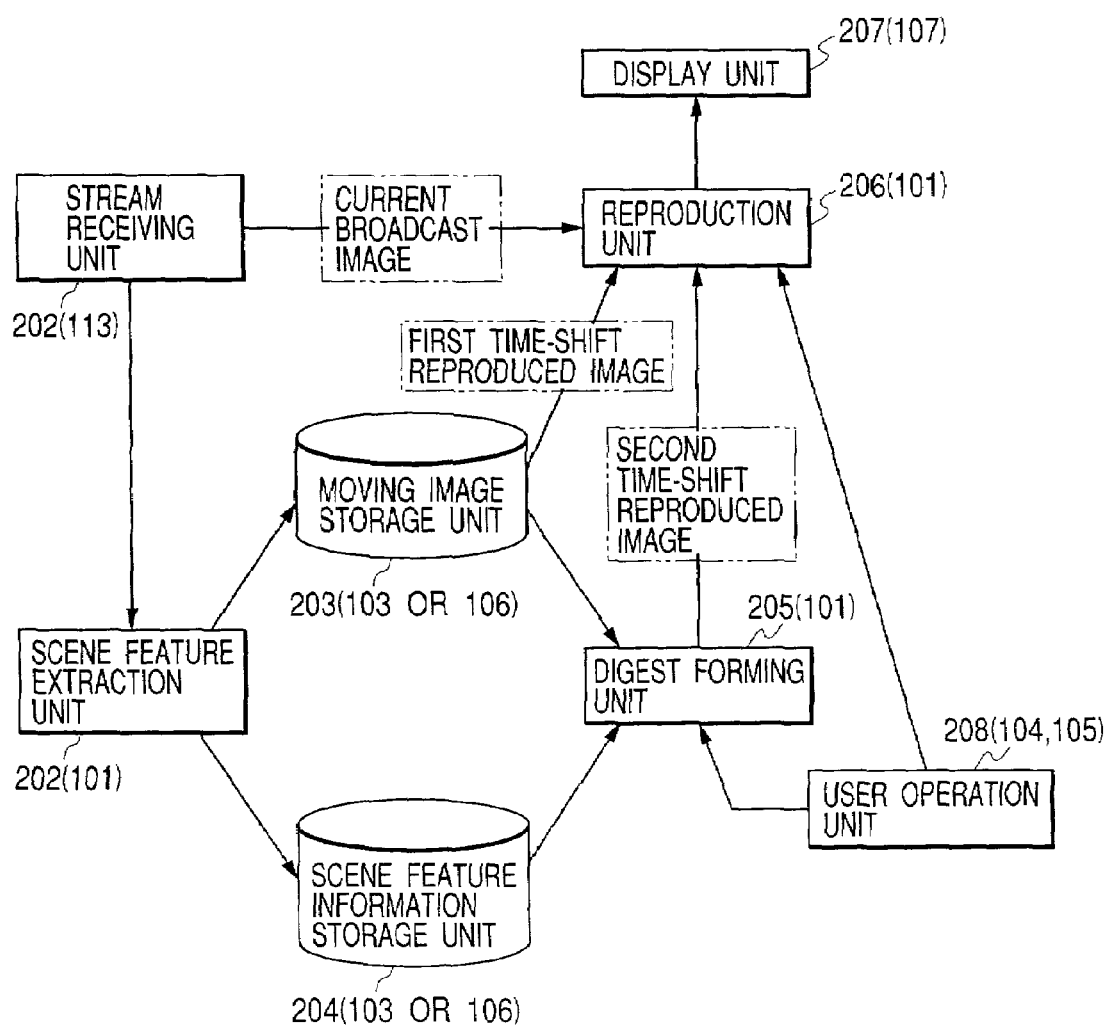
FIG. 2 is a block diagram showing the functional structure of the image processing apparatus of the first embodiment.

FIG. 2 is a functional block diagram of the image processing apparatus shown in FIG. 1.

As shown in FIG. 2, the image processing apparatus 100 has: a stream receiving unit 201 realized by the reception device 113; a scene feature extraction unit 202, a digest forming unit 205, and a reproduction unit 206 respectively realized by CPU 101; a moving image storage unit 203 and a scene feature storage unit 204 respectively realized by RAM 103 or the external storage device 106; a display unit 207 realized by the display device 107; and an user operation unit 208 realized by the keyboard 104, mouse 105 and the like.

The stream receiving unit 201 or reception device 113 receives television ground wave broadcast, television satellite broadcast, cable television broadcast via the network interface 108 or broadcast via a network, and outputs the received information as information streams.

The scene feature extraction unit 202 analyzes information streams (moving image frames) output from the stream receiving unit 201 to acquire the feature of each scene.

The moving image storage unit 203 sequentially stores moving image frames supplied from the scene feature extraction unit 202. The scene feature information storage unit 204 stores scene features supplied from the scene feature extraction unit 202. The digest forming unit 205 forms a digest of moving images in accordance with the scene feature information stored in the scene feature information storage unit 204.

The reproduction unit 206 reproduces moving image frames sequentially output from the stream receiving unit 201 if the reproduction mode is a "current broadcast mode".

The reproduction unit 206 reproduces moving image frames stored in the moving image storage unit 203 if the reproduction mode is a "first time-shift reproduction mode" for reproducing already recorded moving images while recording moving images under reception.

The reproduction unit 206 reproduces moving image frames stored in the moving image storage unit 203 in accordance with digest information formed by the digest forming unit 205, if the reproduction mode is a "second time-shift reproduction mode" for reproducing the digest of already recorded moving images while recording moving images under reception.

The display unit 207 displays moving images reproduced by the reproduction unit 206 for the user. The user operation unit 208 is used for a user to switch between the reproduction modes or to issue other instructions, by using the keyboard 104, mouse 105 or the like.

Examples (1) to (3) of the operation of the image processing apparatus 100 constructed as shown in FIGS. 1 and 2 will be described.

(1) Operation of the Current Broadcast Mode (Normal Reproduction Mode)

When a user designates the "current broadcast mode" as the reproduction mode from the user operation unit 208, current broadcast is reproduced.

Namely, the reproduction unit 206 reproduces frames sequentially supplied from information streams (reception streams) received by the stream receiving unit 201.

(2) Operation of the First Time-Shift Reproduction Mode

When a user designates the "first time-shift reproduction mode" as the reproduction mode from the user operation unit 208, the following operation is performed.

First, frames sequentially supplied from information streams (reception streams) received by the stream receiving unit 201 are stored via the scene feature extraction unit 202 in the moving image storage unit 203.

The moving image storage unit 203 has a sufficiently large storage capacity. However, if the contents in the moving image storage unit 203 exceed the storage maximum limit, older information are overwritten sequentially with the frames.

The reproduction unit 206 sequentially reads the frames starting from the position designated via the user operation unit 208, from the moving image storage unit 203, and reproduces them.

Namely, in this reproduction mode, while inputting moving image data, the moving image data is sequentially reproduced starting from the past time designated by the user.

If the reproduction mode is switched from the "second time-shift reproduction mode" to the "first time-shift reproduction mode", the reproduction unit 206 starts time-shift reproduction from the switched position.

(3) Operation of the Second Time-Shift Reproduction Mode

When a user designates the "second time-shift reproduction mode" as the reproduction mode from the user operation unit 208, the following operation is performed.

First, frames sequentially supplied from information streams (reception streams) received by the stream receiving unit 201 are stored via the scene feature extraction unit 202 in the moving image storage unit 203.

The scene feature extraction unit 202 divides each input frame into scenes, extracts the feature of each scene, and stores the features on the scene feature information storage unit 204.

By referring to and analyzing the scene feature information stored in the scene feature information storage unit 204, the digest forming unit 205 forms a digest.

The reproduction unit 206 reproduces the digest formed by the digest forming unit 205. Immediately after this reproduction catches up the current broadcast, the reproduction mode is switched to the "current broadcast mode" to reproduce the current broadcast.

Namely, in this reproduction mode, while inputting moving image data, a digest of already recording moving image data designated by the user is reproduced until the current moving image is caught up.

Next, the details of a process of extracting scene feature information and a process of forming a digest will be given.

(1) Process of Extracting Scene Feature Information

Figure 3:
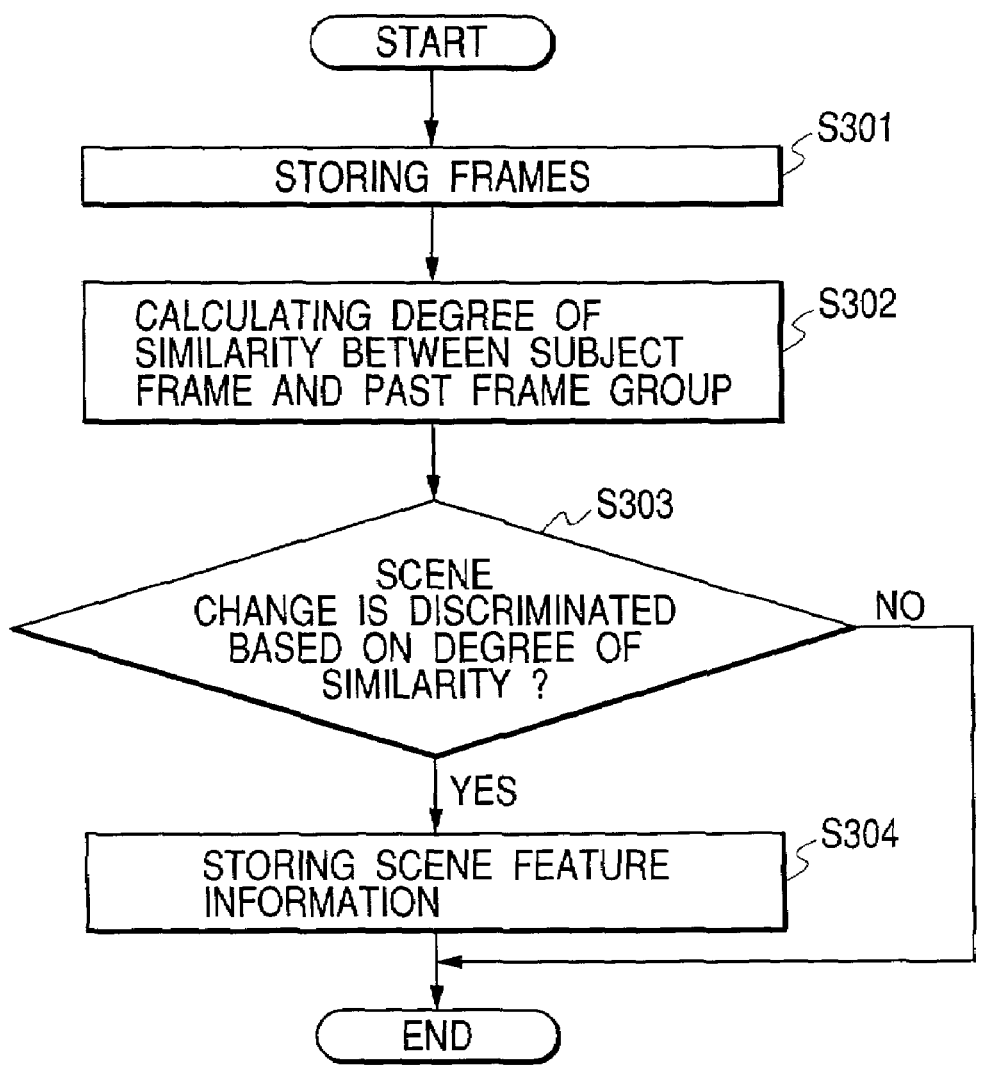
FIG. 3 is a flow chart illustrating a process to be executed by a scene feature extraction unit according to the present invention.

FIG. 3 is a flow chart illustrating the process of extracting scene feature information to be executed by the scene feature extraction unit 202.

Step S301:

First, the scene feature extraction unit 202 stores frames received from the stream receiving unit 201 in the moving image storage unit 203. In this case, the scene feature extraction unit 202 gives a frame ID to each frame.

Step S302:

The scene feature extraction unit 202 performs calculation of an inter-frame similarity degree distance to sequentially calculate the degree of similarity between a frame stored in the moving image storage unit 203 and a past frame group.

The past frame group may be a single frame or a plurality of frames, and the algorithm for the similarity distance calculation is not specifically limited. The past frame group to be compared is stored in a memory not shown.

Figures 4, 5:
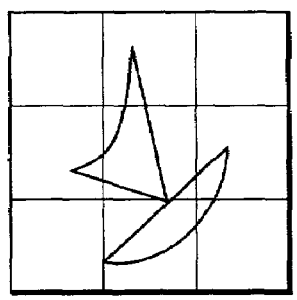
FIG. 4 is a diagram illustrating an example of block division of frames according to the present invention.
FIG. 5 is a diagram illustrating an example of scene feature information extracted by the scene feature extraction unit according to the present invention.

A specific example of the process at Step S302 is given in the following. First, each of the preceding frame and current frame is divided into a plurality of blocks in two directions as shown in FIG. 4.

Next, an average value of RGB of each of divided blocks is calculated. A square sum of differences between RGB average values of respective blocks of the current frame and corresponding respective blocks of the preceding block is calculated. This square sum is used as the inter-frame similarity degree distance representative of the degree of an intensity of scene change.

The frames are more similar if the inter-frame similarity degree distance is shorter, whereas they are not similar as the inter-frame similarity degree distance is longer. Namely, if the inter-frame similarity degree distance is long, there is a large possibility that the current frame has a scene change relative to the preceding frame.

This process can be expressed by the following equation:

$$\sum_{i=1}^{K} \{(P1_{iR} - P2_{iR})^2 + (P1_{iG} - P2_{iG})^2 + (P1_{iB} - P2_{iB})^2\}$$

where
i: block under processing,
K: the number of divided blocks,
$P1_{iR}$: average value of R channel of i-th block in preceding frame,
$P1_{iG}$: average value of G channel of i-th block in preceding frame,
$P1_{iB}$: average value of B channel of i-th block in preceding frame,
$P2_{iR}$: average value of R channel of i-th block in current frame,
$P2_{iG}$: average value of G channel of i-th block in current frame, and
$P2_{iB}$: average value of B channel of i-th block in current frame.

Step S303:

The scene feature extraction unit 202 judges whether there is a scene change, in accordance with the result (similarity) of the inter-frame similarity degree distance calculation at Step S302.

If it is judged that there is no scene change, the process is terminated.

Step S304:

If it is judged at Step S303 that there is a scene change, the scene feature extraction unit 202 stores the scene feature information.

Thereafter, this process is terminated.

The scene feature information includes: for example, as shown in FIG. 5, a scene ID given to each scene; a leading frame ID of the scene; a length of the scene; an intensity of a scene change which intensity is one of characteristics of the scene; and the like.

The "length of the scene" indicates the number of frames between the frame having the frame ID indicating a current scene change and the frame having the frame ID indicating the previous scene change.

The "intensity of a scene change" indicates an intensity of a scene change and is represented by an inverse of the similarity degree. It is herein assumed that a similarity degree "0" does not exist. The lower the similarity degree, the scene change is more intense, and the value of the "intensity of a scene change" becomes larger.

(2) Process of Forming a Digest

Figure 6:
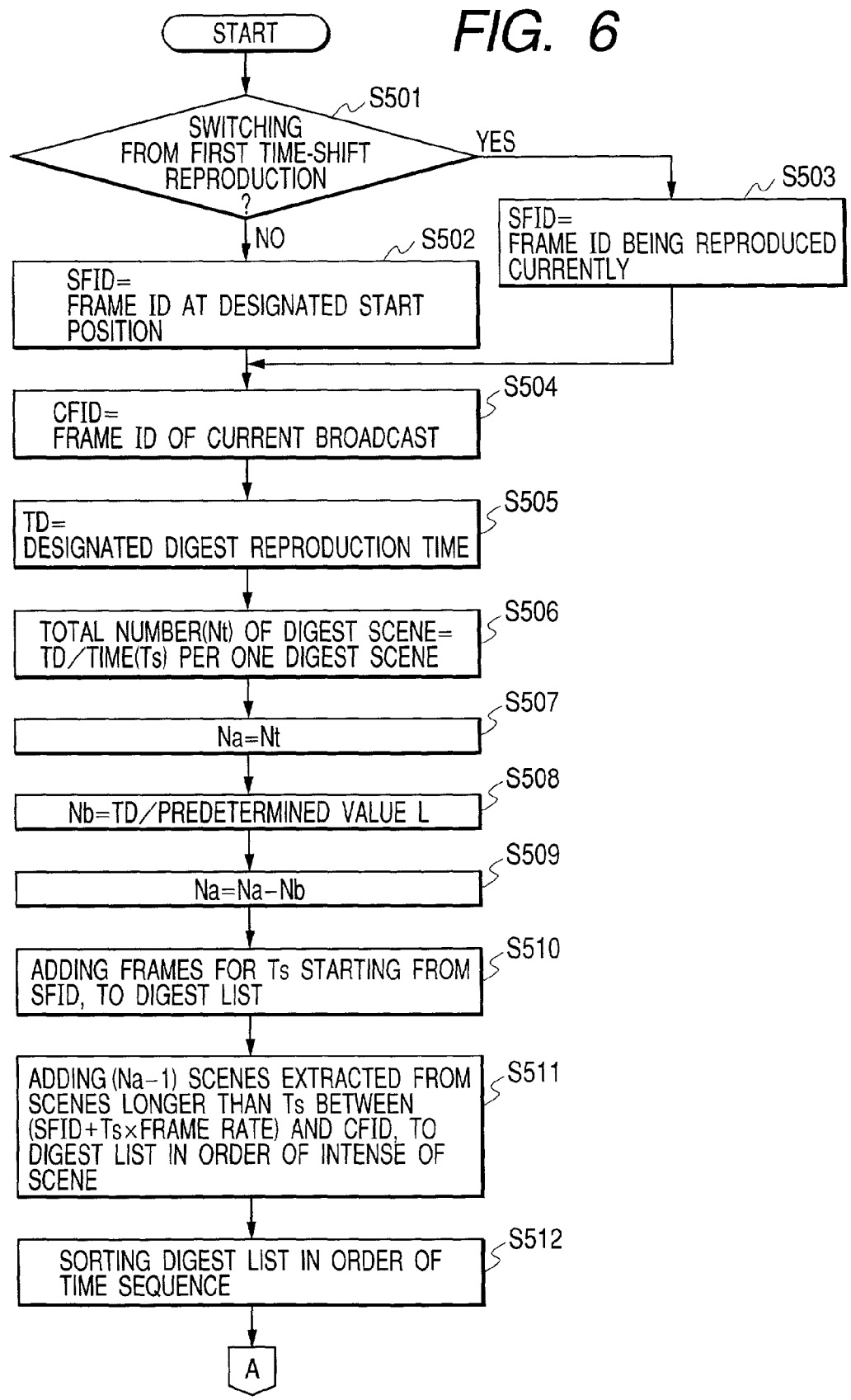
FIG. 6 is a flow chart illustrating a process (S501 to S512) to be executed by a digest forming unit according to the present invention.
Figure 7:
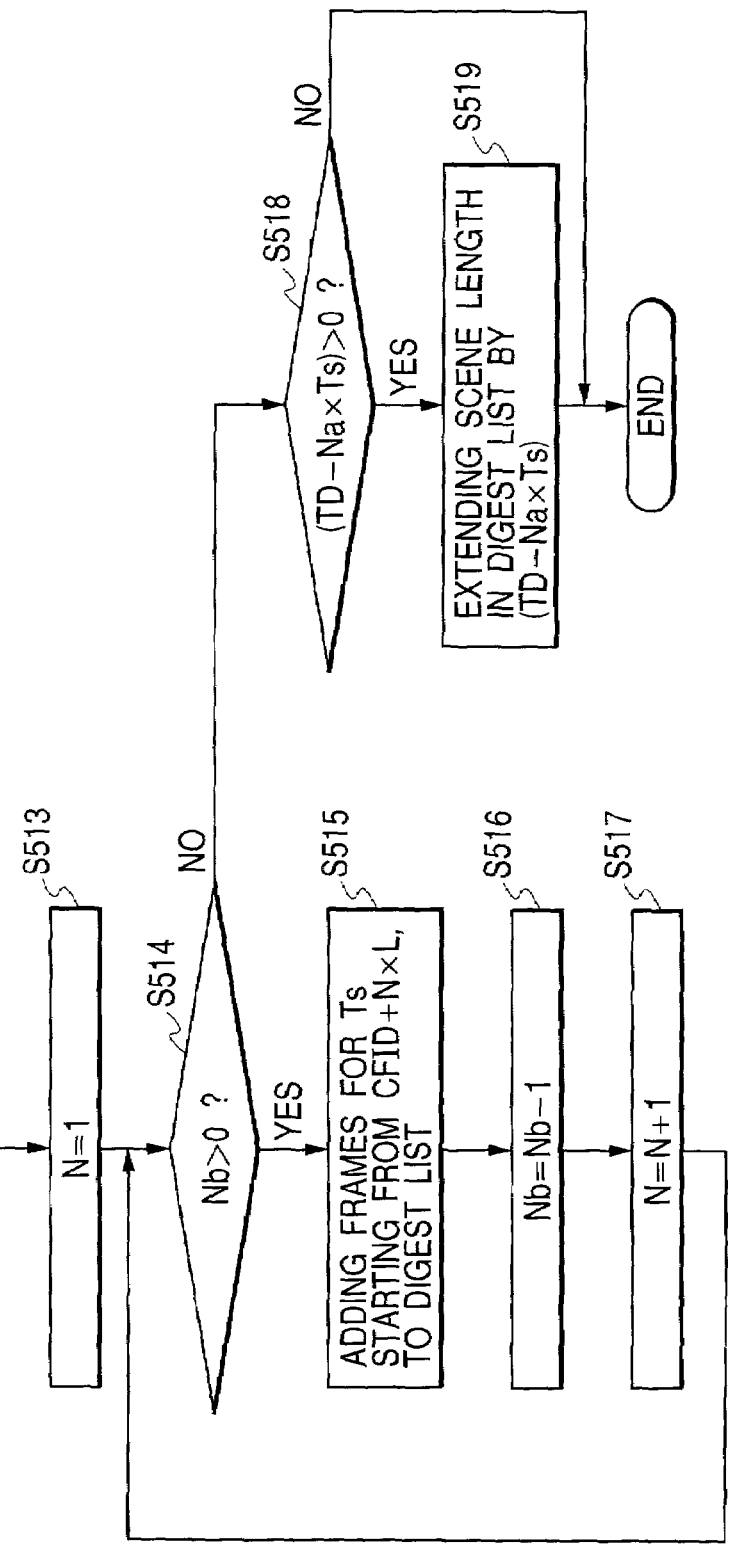
FIG. 7 is a flow chart illustrating a process (S513 to S519) to be executed by the digest forming unit according to the present invention.

FIGS. 6 and 7 are flow charts illustrating a process of forming a digest to be executed by the digest forming unit 205.

In the following description, "SFID", "CFID", "TD" and the like represent flags or buffers of a working memory (such as RAM 103).

Step S501:

When the "second time-shift reproduction mode" is designated by a user, the digest forming unit 205 judges whether the reproduction mode is switched from the "first time-shift reproduction mode".

Steps S502 and S503:

If it is judged at Step S501 that the reproduction mode is switched from the "first time-shift reproduction mode", the digest forming unit 205 sets the frame ID currently under reproduction, to "SFID" (Step S503).

If the reproduction mode is not switched from the "first time-shift reproduction mode", i.e., if the reproduction mode is switched from the "current broadcast mode", then the digest forming unit 205 sets the frame ID corresponding to the start position designated by the user, to "SFID".

The time-shift reproduction therefore starts from the frame designated by "SFID".

Steps S504 and S505:

The digest forming unit 205 sets the frame ID of the current broadcast, to "CFID" (Step S504), and sets a digest reproduction time designated by the user, to "TD" (Step S505).

The reproduction time settable as "TD" is shorter than ("CFID"-"SFID").

Step S506:

The digest forming unit 205 calculates the total digest scene number Nt from the following equation:

TD/(time Ts per one digest scene)

If there is a remainder when this equation is executed, this remainder is neglected. Although not specifically limited, "Ts" is preferably about 2 seconds which do not cause flickers on human eyes.

Step S507:

The digest forming unit 205 sets "Nt" obtained at Step S506, to "Na".

"Na" represents the number of scenes in the digest to be reproduced before the frame designated by "CFID".

Step S508:

The digest forming unit 205 determines the number Nb of scenes in the digest to be reproduced until the current broadcast is caught up after the frame designated by "CFID".

Figures 8, 9:
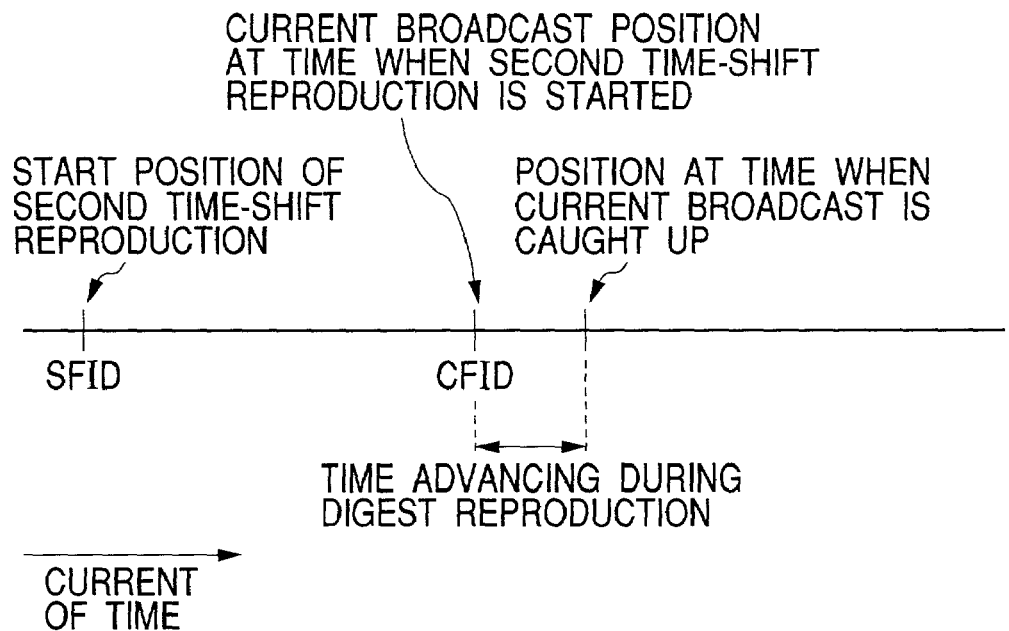
FIG. 8 is a diagram illustrating the time duration during a time-shift reproduction mode of the image processing apparatus according to the present invention.
FIG. 9 is a diagram showing an example of a digest list formed by the digest forming unit according to the present invention.

More specifically, even during the digest reproduction, the current broadcast progresses. Therefore, in order to eventually catch up the current broadcast, for example, as shown in FIG. 8, it is necessary to take into consideration the period (a time advancing during digest reproduction) between the position ("CFID") of the current broadcast at the start of the second time-shift reproduction and the position of the current broadcast when it is caught up.

The contents corresponding to time advancing during the digest reproduction is determined from now, and at the present the partition and intensity of a scene in such the contents cannot be known. Since the intensity of a scene change cannot be used for such the contents with the method of determining at once the scenes to be reproduced, scenes are reproduced for Ts minutes at a predetermined time interval. This predetermined time interval is represented by a predetermined value L.

It is assumed that the predetermined value L is sufficiently longer than Ts and ensures that the moving image contents change with a large probability. Although not specifically limited, the predetermined value is preferably about 5 minutes (300 seconds).

The number Nb of scenes to be reproduced in the digest until the current broadcast is caught up after the frame designated by "CFID", is therefore calculated from the following equation:

$$Nb = TD/L$$

If TD can not be divided by L, a remainder of the division is neglected.

Step S509:

The digest forming unit 205 sets again the calculation result (Na−Nb) to the "Na" set at step S507 (the number of scenes to be reproduced in the digest before the frame designated by "CFID"). The reason for this is that the relation (Nt=Na+Nb) is required to be satisfied because the number of scenes capable of being reproduced during the digest reproduction is fixed to "Nt".

Step S510:

The digest forming unit 205 adds frames for Ts starting from the frame represented by "SFID", to a digest list. This addition is made in order for the user not to feel strange, because the frame represented by "SFID" is not reproduced although the user designates the time-shift reproduction starting from the frame represented by "SFID".

For example, as shown in FIG. 9, the digest list includes a start frame ID and a length.

The "length" is represented by the number of frames. For example, the length of Ts (second) is 60 frames if the frame rate is 30 frames/sec.

Step S511:

With reference to the scene feature information stored in the scene feature information storage unit 204, the digest forming unit 205 picks up (Na−1) scenes in the order of higher intensity of a scene change, from among scenes longer than Ts and between (SFID+Ts×frame rate) and CFID, and adds the picked-up scenes to the digest list.

In this case, the start frame ID of the scene corresponds to the "start frame ID" in the digest list, and 60 frames corresponding to Ts correspond to the "length" in the digest list. The reason for picking up the (Na−1) frames is that one frame has been added to the digest list at Step S510. Picking up frames in the order of intensity of a scene change is based on the assumption that the more intense the scene change, the viewer is impressed more.

Step S512:

The digest forming unit 205 sorts the digest list in the order of time sequence.

Step S513: refer to FIG. 7

The digest forming unit 205 sets an initial value "1" to "N" in order to prepare for a process to be later described.

Step S514:

The digest forming unit 205 checks whether "Nb" (the number of scenes in the digest list to be reproduced until the current broadcast is caught up after the frame represented by "CFID") is positive or not.

Steps S515 to S517:

If the judgement result at Step S514 is "Nb>0", the digest forming unit 205 recognizes that scenes to be added to the end of the digest list exist even among scenes after the frame represented by "CFID", and adds scenes for Ts starting from the frame represented by "CFID", to the digest list at the position N×L p(Step S515).

The digest forming unit 205 decrements "Nb" (Step S516) and increments "N" (Step S517). Thereafter, the flow returns to Step S514 whereat if "Nb" is positive, the process starting from Step S515 is repeated.

Namely, scenes for Ts starting from the position near the frame represented by "CFID" are added to the digest list at the position of every predetermined value L. If "Nb" is 0 at Step S514, the flow branches to Step S518.

Steps S518 and S519:

If the judgement result at Step S514 is not "Nb>0", the digest forming unit 205 checks whether (Td−Na×Ts) is positive or not (Step S518). Namely, the digest forming unit 205 checks whether the designated digest reproduction time subtracted from the total reproduction time of the digest list has any remainder.

If this check result is not "(TD−Na×Ts)>0", this process is terminated. If this check result is "(TD−Na×Ts)>0", then the digest forming unit 205 elongates the length of each scene in the digest list by (TD−Na×Ts) until it becomes equal to TD.

With the processes shown in FIGS. 6 and 7, the digest list such as shown in FIG. 9 is formed. These processes do not require particular calculations so that the process time is very short. The influence upon the digest reproduction time can therefore be neglected.

The reproduction unit 206 refers to the digest list formed in the above manner. Namely, with reference to the digest list formed by the digest forming unit 205, the reproduction unit 206 sequentially picks up the frame from the moving image storage unit 203, and displays it on the display unit 207. Thereafter, the digest unit 206 reproduces the current broadcast.

In the second embodiment of the present invention, in the process of forming a digest during the "second time-shift reproduction mode" of the image processing apparatus 100 shown in FIGS. 1 and 2, the digest list is changed according to the need, by referring to scene feature information newly detected during the digest reproduction.

Figure 10:
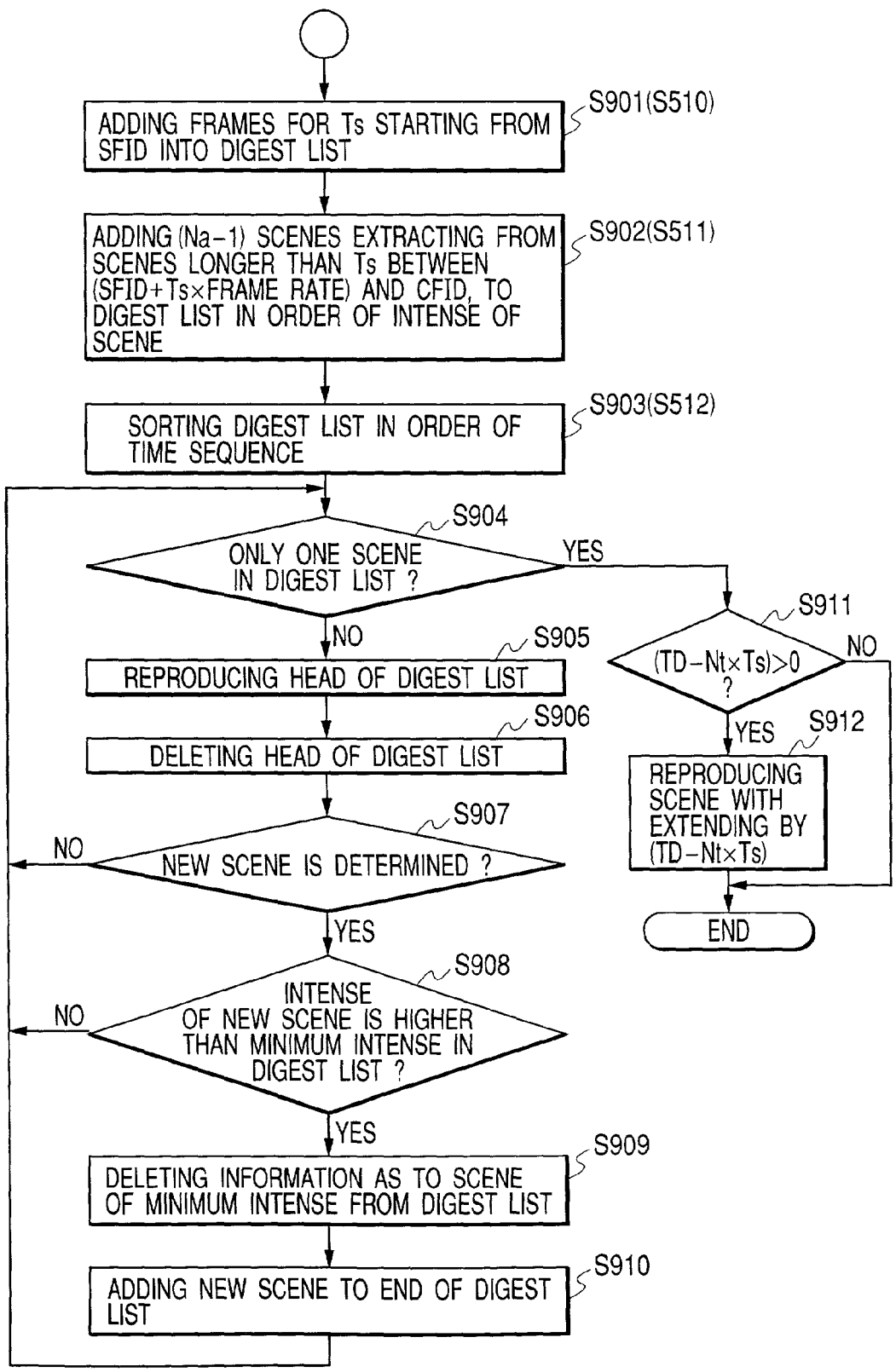
FIG. 10 is a flow chart illustrating a process to be executed by a digest forming unit according to a second embodiment.

This process is illustrated in the flow chart of FIG. 10.

The process shown in FIG. 10 is performed after Steps S501 to S506 shown in FIG. 6 are executed. In the process shown in FIG. 10, Step S901 is similar to the process at Step S510 shown in FIG. 6, Step S902 is similar to the process at Step S511 shown in FIG. 6, and Step S902 is similar to the process at Step S512 shown in FIG. 6, and so the detailed description of these Steps is omitted.

After the execution of Steps S501 to S506 and Steps S901 to S903 (Steps S510 to S512) shown in FIG. 6, first the digest forming unit 205 judges whether the digest list contains only the information of one scene (Step S904). If it is judged that the digest list contains only the information of one scene, the flow branches to Step S911, whereas if the digest list contains information of two or more scenes, the flow advances to Step S905.

If it is judged at Step S904 that the digest list contains information of two or more scenes, first the digest forming unit 205 supplies the reproduction unit 206 with only the information of the head-scene in the digest list. The reproduction unit 206 reproduces the head scene (Step S905).

Next, the digest forming unit 205 deletes the information of the head scene reproduced by the reproduction unit 206 from the digest list (Step S906).

Next, with reference to the scene feature information stored in the scene feature information storage unit 204, the digest forming unit 205 judges whether a new scene is determined (Step S907). This is because the current broadcast is received even during the reproduction of the head scene in the digest list and the scene feature extraction unit 202 continues the extraction of a scene feature.

If this judgement result indicates that a new scene is not determined, the flow returns to Step S904 whereat the digest forming unit 205 repeats the process at the subsequent Steps.

If the judgement result at Step S907 indicates that a new scene is determined, the digest forming unit 205 judges whether the intensity of a change in the new scene is higher than the lowest intensity of a change in each of the scenes in the digest list (Step S908).

If this judgement result indicates that the intensity of a change in the new scene is not higher than the lowest intensity of a change in each of the scenes in the digest list, the flow returns to Step S904 whereat the digest forming unit 205 repeats the process at the subsequent Steps.

If the judgement result at Step S908 indicates that the intensity of a change in the new scene is higher than the lowest intensity of a change in each of the scenes in the digest list, the digest forming unit 205 deletes the information of the scene in the digest list having a lowest intensity value (Step S909).

The digest forming unit 205 adds the new scene to the end of the digest list (Step S910). Thereafter, the flow returns to Step S904 whereat the digest forming unit 205 repeats the process at the subsequent Steps.

If the judgement result at Step S904 indicates that the digest list contains only the information of one scene, the digest forming unit 205 judges whether (TD−Nt×Ts) is positive or not (Step S911).

If this judgement result is not "(TD−Nt×Ts)>0", the process is terminated.

If the judgement result at Step S911 is "(TD−Nt×Ts)>0", i.e., if the designated digest reproduction time is longer than the total time for reproduction of scenes in the digest list, then the digest forming unit 205 supplies the reproduction unit 206 with the information that the scene to be last reproduced is to be reproduced with being extended by (TD−Nt×Ts).

The reproduction unit 206 reproduces the scene to be last reproduced by extending it by (TD−Nt×Ts) (Step S912), accordingly.

Thereafter, the process is terminated.

In the above-described first and second embodiments, scene features are extracted after stream reception and utilized by the "second time-shift reproduction mode". In the third embodiment of the present invention, scene feature information is extracted beforehand on the stream transmission side, and transmitted together with the moving image data. The reception side uses the received scene feature information.

Figure 11:
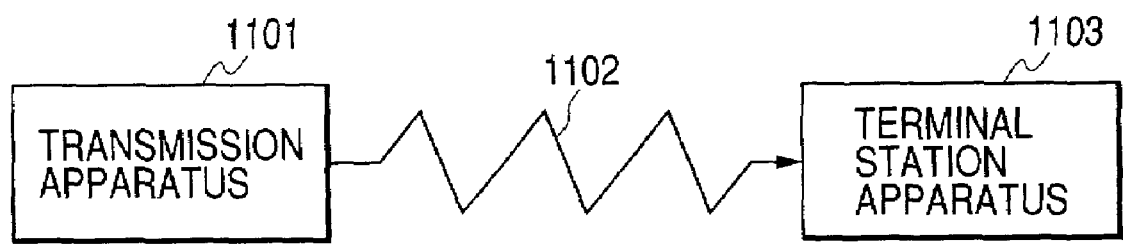
FIG. 11 is a block diagram showing the structure of an image processing system according to a third embodiment.

FIG. 11 is a diagram showing the structure of an image processing system according to the third embodiment.

A transmission apparatus 1101 multiplexes moving image data and scene feature information and transmits the multiplexed stream. A communication network 1102 corresponds to radio waves for a television broadcast, coaxial cables or optical fibers for CATV, the Internet, or the like. A terminal station apparatus 1103 performs stream reception and reproduces moving images.

Figure 12:
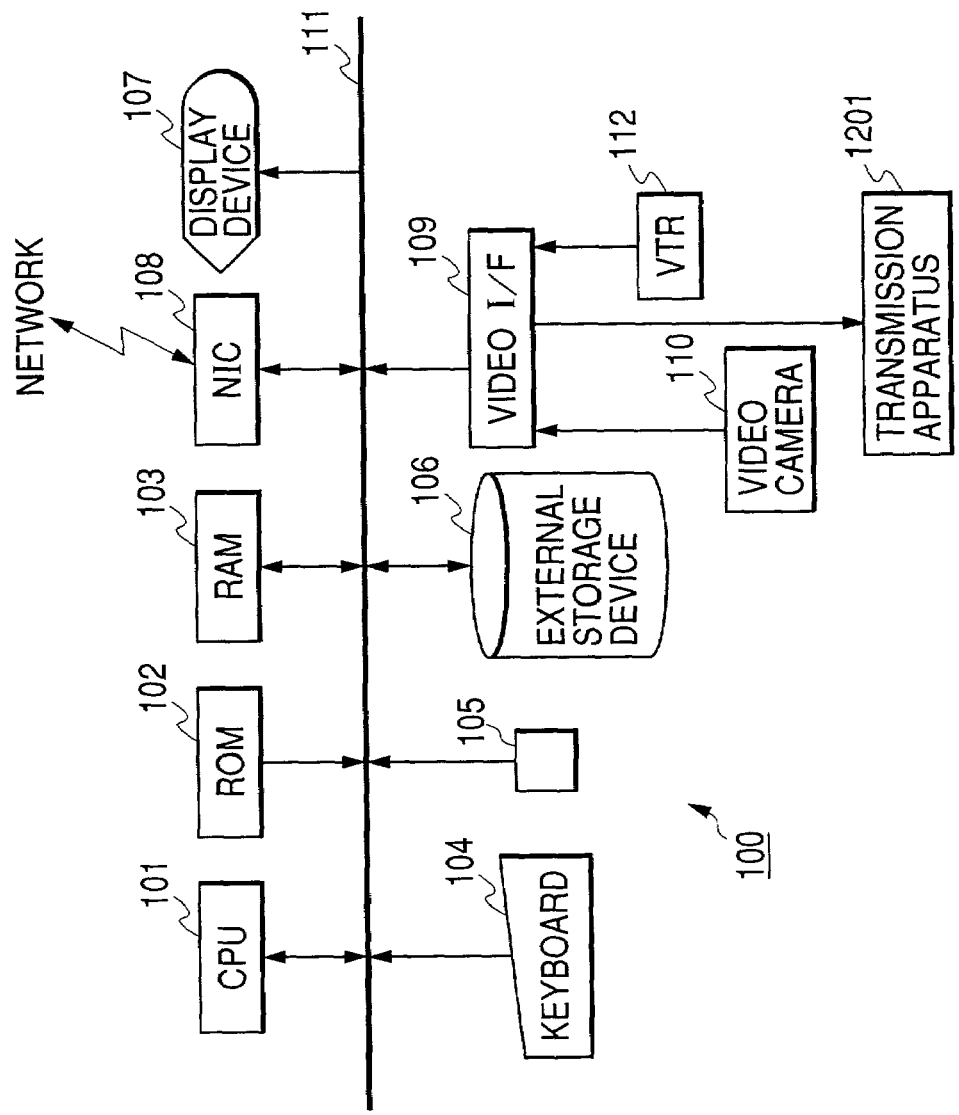
FIG. 12 is a block diagram showing the control structure of a transmission apparatus of the third embodiment.

FIG. 12 is a diagram showing the control structure of the transmission apparatus 1101.

Those components from CPU 101 to VTR 112 are similar to those of the first and second embodiments, and so the description thereof is omitted.

A transmission apparatus 1201 transmits broadcast radio waves of a ground wave broadcast, a satellite broadcast and the like. For stream distribution via the Internet, streams can be transmitted via NIC 108.

Figure 13:
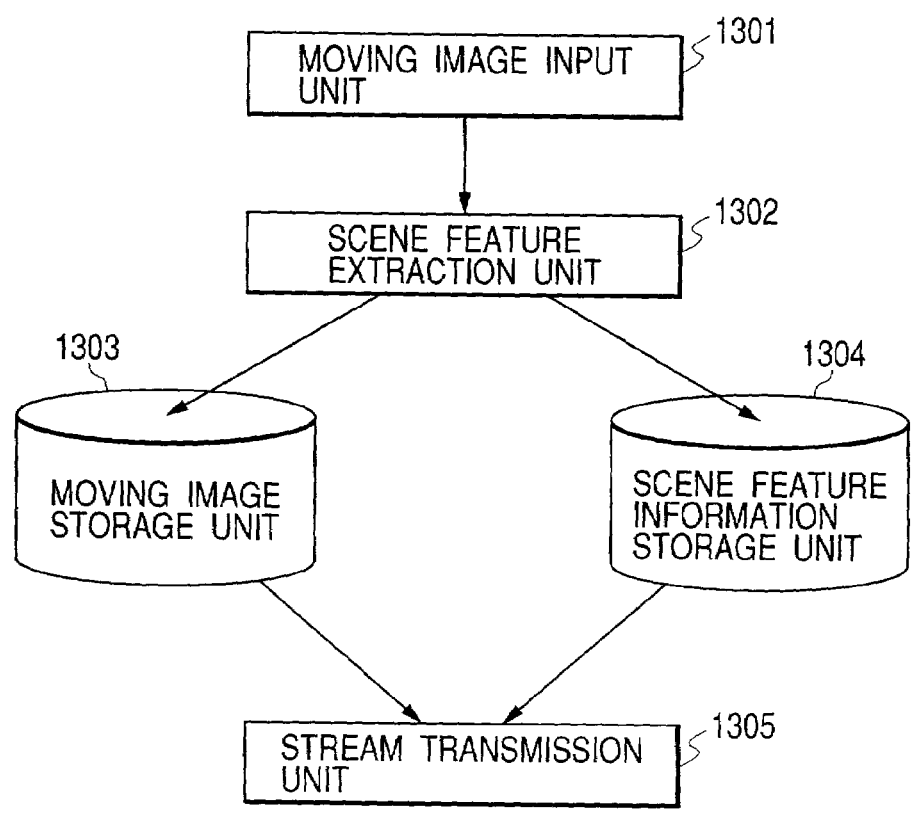
FIG. 13 is a block diagram showing the control structure of a transmission apparatus of the third embodiment.

FIG. 13 is a diagram showing the functional structure of the transmission apparatus 1101 of the embodiment.

A moving image input unit 1301 receives moving image data from the video camera 110 or VTR 112 via the video I/F 109, and extracts frames to be passed to a scene feature extraction unit 1302.

The scene feature extraction unit 1302, a moving image storage unit 1303, and a scene feature information storage unit 1304 are similar to the scene feature extraction unit 202, moving image storage unit 203, and scene feature information storage unit 204 of the first and second embodiment shown in FIG. 2, and so the detailed description thereof is omitted.

A steam transmission unit 1305 reads moving image data from the moving image storage unit 1303 and scene feature information from the scene feature information storage unit 1304, and multiplexes them to transmit multiplexed streams.

The control structure of the terminal station apparatus 1103 shown in FIG. 11 is similar to that of the first and second embodiments shown in FIG. 1, and so the description thereof is omitted.

Figure 14:
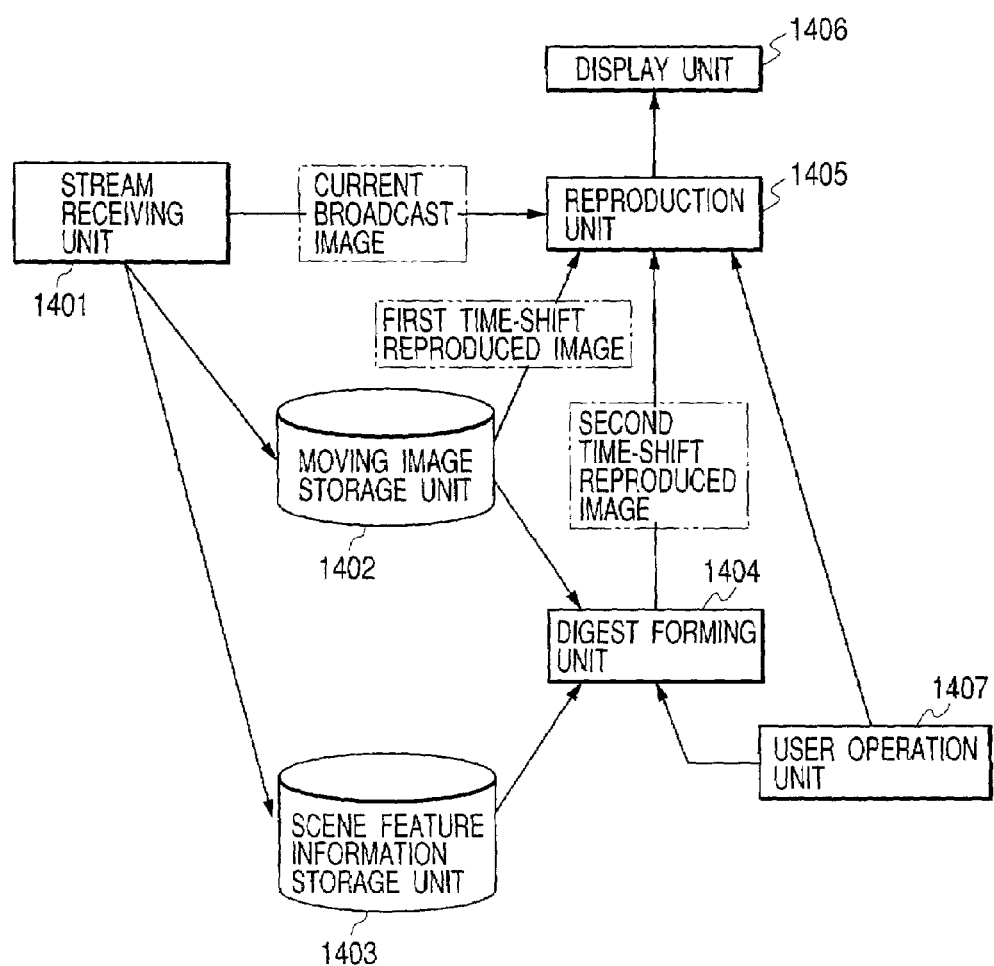
FIG. 14 is a block diagram showing the control structure of a terminal station apparatus of the third embodiment.

FIG. 14 is a diagram showing the functional structure of the terminal station apparatus 1103 of the embodiment.

A stream receiving unit 1401 is similar to the stream reception unit 201 of the first and second embodiments shown in FIG. 2. The stream reception unit 1401 demultiplexes the multiplexed stream to separate it into moving image data and scene feature information, which are then stored in a moving image storage unit 1402 and a scene feature storage unit 1403, respectively.

The moving image storage unit 1402, scene feature information storage unit 1403, a digest forming unit 1404, a reproduction unit 1405, a display unit 1406, and a user operation unit 1407 are similar to the moving image storage unit 203, scene feature information storage unit 204, digest forming unit 205, reproduction unit 206, display unit 207, and user operation unit 208 of the first and second embodiments shown in FIG. 2, and so the detailed description thereof is omitted.

With reference to FIG. 13, the operation of the transmission apparatus 1101 will be described.

First, the moving image input unit 1301 receives moving image data, and extracts frames to be passed to the scene feature extraction unit 1302.

Next, the scene feature extraction unit 1302 extracts scenes and scene feature information to store frames in the moving image storage unit 1303 and store the scene feature information in the scene feature information storage unit 1304 (the detailed operation is similar to that of the scene feature extraction unit 202, moving image storage unit 203 and scene feature information storage unit 204 of the first and second embodiment, and so the description thereof is omitted).

Next, the stream transmission unit 1305 sequentially reads the frames from the moving image storage unit 1303 and the corresponding scene feature information from the scene feature information storage unit 1304, and multiplexes them to obtain a multiplexed stream to be transmitted to the communication network 1102. For example, a multiplexing method may be a method standardized by the MPEG-2 system by which moving image data and scene feature information are packetized into packetized elementary streams (PES) which are then multiplexed into a multiplexed stream of transport stream (TS).

Next, with reference to FIG. 14, the operation of the terminal station apparatus 1103 will be described.

First, the stream reception unit 1401 receives a multiplexed stream, and demultiplexes it to separate it into moving image data and scene feature information, which are stored respectively in the moving image storage unit 1402 and scene feature storage unit 1403. The operation of the units from the digest forming unit 1404 to user operation unit 1407 is similar to that of the units from the digest forming unit 205 to user operation unit 208 of the first and second embodiment, and so the description thereof is omitted.

As described so far, according to the first to third embodiments, scene feature information of each of a plurality of scenes constituting input moving images (moving images of a received television broadcast, and the like) is stored, a digest of moving images to be reproduced is formed in accordance with the scene feature information and an external instruction (such as the designation position of the second time-shift reproduction by a user and a second time shift reproduction start position), and moving images are reproduced from the digest. Accordingly, a digest of moving images from any time in the past designated by the user up to now can be reproduced so that the current input moving images are eventually caught up.

During the section from the second time-shift reproduction start position to the second time-shift reproduction designation position represented by the external instruction, a digest is formed in accordance with the scene feature information. During the section from the second time-shift reproduction designation position to the second time-shift reproduction end position (an advanced time duration during the digest reproduction) represented by the external instruction, a digest is formed at a predetermined time interval. It is therefore possible to form the digest while taking into consideration the moving images input during the digest reproduction. Therefore, the user does not feel strange when the current input moving image is caught up.

A user can designate the time required for catching up the current input moving image. Moving images can be viewed efficiently even if the moving image reproduction goes back for a long time to the past.

Since a digest is formed by using scene feature information, a proper digest can be formed and the contents of reproduced moving images can be easily grasped.

In the first to third embodiments, the following arrangements (1) to (8) are possible.

(1) In the above embodiments, a frame ID is used for identifying each frame. Instead, a time code may be used. Although the number of frames is used as the scene length, a time may be used as the scene length.

(2) In the above embodiments, frames for the predetermined period starting from the head frame of the scene having an intense scene change are used for forming a digest. The embodiments are not limited only to this, but frames for a predetermined time starting from the last scene or the middle scene may be used for forming a digest.

(3) In the embodiments, the intensity of a scene change is used as the scene feature. The embodiments are not limited only to this, but the intensity of motion of a subject in the scene or the like may be used as the scene feature.

For example, the similarity degree between frames in a scene is measured statistically, and if the similarity degree is high, the motion is assumed to be gentle, whereas if the similarity degree is low, the motion is assumed to be rapid. Frames for a predetermined time starting from the start, last or middle scene are used for forming a digest. In this case, the frame ID of a frame having the most rapid motion in the scene is extracted, and frames for a predetermined time around the frame having the most rapid motion may be used for forming a digest.

(4) In the above embodiments, the digest reproduction time is designated by a user. The embodiments are not limited only to this. For example, the digest reproduction time may be determined automatically. For example, the digest reproduction time is set to 10% of (CFID-SFID).

(5) In the above embodiments, the digest is formed in accordance with the intensity of a scene change during the section from "CFID" to "SFID". The embodiments are not limited only to this. For example, similar to the case of after "CFID", frames for a predetermined time may be used at a predetermined time interval for forming a digest.

(6) In the third embodiment, although the scene feature extraction unit 1302 extracts scenes and scene features, they may be manually supplied when moving images are generated.

(7) The scene feature extraction unit 1302 of the third embodiment may be a separate apparatus to supply scene feature information extracted by the separate apparatus together with moving image data to the transmission apparatus.

(8) It is obvious that the object of the present invention can be achieved by supplying a storage medium storing software program codes realizing the function of the host and terminal of the first to third embodiments to a system or apparatus, and by making a computer (CPU or MPU) of the system or apparatus read and execute the program codes stored in the storage medium.

In this case, the software program codes themselves read from the storage medium realize the functions of the first to third embodiments. Therefore, the storage medium storing the program codes constitutes the present invention.

The storage medium for storing such program codes may be a ROM, a floppy disk, a hard disk, an optical disk, a magneto optical disk, a CD-ROM, a CD-R, a magnetic tape, a nonvolatile memory card, or the like.

It is obvious that the scope of the present invention includes the case wherein not only the computer executes the read program codes to realize the functions of the first to third embodiments but also an OS running on the computer or the like performs a portion or the whole of actual processes in accordance with the program codes to realize the functions of the first to third embodiments.

It is obvious that the scope of the present invention also contains the case wherein the functions of the first to third embodiments can be realized by writing the program codes read from the storage medium into a memory of a function expansion board inserted into a computer or of a function expansion unit connected to the computer, and thereafter by executing a portion or the whole of actual processes by a CPU of the function expansion board or function expansion unit.

In other words, the foregoing description of embodiments has been given for illustrative purposes only and not to be construed as imposing any limitation in every respect.

The scope of the present invention is, therefore, to be determined solely by the following claims and not limited by the text of the specifications and alterations made within a scope equivalent to the scope of the claims fall within the true spirit and scope of the present invention.

What is claimed is:

1. An image processing apparatus for reproducing already stored moving image data while storing moving image data currently input, said image processing apparatus comprising:

a) moving image data storing means for storing input moving image data;

b) scene feature information extracting means for extracting scene feature information of each of a plurality of scenes constituting the moving image data stored in said moving image data storing means;

c) digest forming means for forming digest data for reproducing a digest of the moving image data, in accordance with the scene feature information extracted by said scene feature information extracting means; and d) reproducing means for reproducing a digest of the moving image data stored in said moving image data storing means in accordance with the digest data formed by said digest data forming means, wherein reproduction of the digest is performed in response to an external instruction, and wherein said digest forming means forms digest data including a scene having a predetermined length starting from a digest reproduction start position represented by the external instruction.

2. An image processing method of reproducing already stored moving image data while storing moving image data currently input, said image processing method comprising:

a) a storing step of storing input moving image data in moving image data storing means;

b) a scene feature information extracting step of extracting scene feature information of each of a plurality of scenes constituting the moving image data stored in said moving image data storing means;

c) a digest forming step of forming digest data for reproducing a digest of the moving image data, in accordance with the scene feature information extracted in said scene feature information extracting step; and d) a reproducing step of reproducing a digest of the moving image data stored in said moving image data storing means in accordance with the digest data formed in said digest data forming step, wherein reproduction of the digest is performed in response to an external instruction, and wherein said digest forming step includes a step of forming digest data including a scene having a predetermined length starting from a digest reproduction start position represented by the external instruction.

* * * * *

UNITED STATES PATENT AND TRADEMARK OFFICE
CERTIFICATE OF CORRECTION

PATENT NO. : 7,145,684 B2  Page 1 of 1
APPLICATION NO. : 10/022371
DATED : December 5, 2006
INVENTOR(S) : Hiroshi Tojo It is certified that error appears in the above-identified patent and that said Letters Patent is hereby corrected as shown below:

IN THE DRAWINGS:
Sheet No. 4, Figure 5, "INTENCE" should read --INTENSITY--.

COLUMN 4:
Line 31, "an" should read --a--.

COLUMN 5:
Line 58, "up" should read --up to--.

COLUMN 8:
Line 8, "up" should read --up to--.

COLUMN 9:
Line 21, "p(Step" should read --(Step--.

COLUMN 10:
Line 12, "head-scene" should read --head scene--.

COLUMN 11:
Line 31, "embodiment" should read --embodiments--.
Line 34, "steam" should read --stream--.

COLUMN 12:
Line 4, "embodiment," should read --embodiments,--.
Line 25, "embodiment," should read --embodiments,--.
Line 52, "up" should read --up to--.

Signed and Sealed this

Twenty-third Day of October, 2007

JON W. DUDAS
*Director of the United States Patent and Trademark Office*